United States Patent
Brandts

(10) Patent No.: US 8,830,632 B1
(45) Date of Patent: Sep. 9, 2014

(54) GIMBAL ASSEMBLY RESONANCE MODE ANTI-BIASING

(71) Applicant: Seagate Technology LLC, Cupertino, CA (US)

(72) Inventor: Jackson W. Brandts, Watertown, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/784,360

(22) Filed: Mar. 4, 2013

(51) Int. Cl.
*G11B 5/48* (2006.01)
*G11B 21/21* (2006.01)

(52) U.S. Cl.
CPC ..................................... *G11B 21/21* (2013.01)
USPC ...................................................... 360/244.9

(58) Field of Classification Search
CPC .......... G11B 21/24; G11B 21/16; G11B 5/48; G11B 5/56
USPC ...................................................... 360/244.9
See application file for complete search history.

(56) References Cited

U.S. PATENT DOCUMENTS

| | | | |
|---|---|---|---|
| 6,088,192 A | 7/2000 | Riener et al. | |
| 6,404,600 B1* | 6/2002 | Hawwa et al. | 360/294.4 |
| 6,680,826 B2* | 1/2004 | Shiraishi et al. | 360/294.4 |
| 6,738,229 B2 | 5/2004 | Williams | |
| 6,920,018 B2 | 7/2005 | Oh et al. | |
| 7,038,888 B2* | 5/2006 | Ma | 360/294.4 |
| 7,068,473 B2* | 6/2006 | O'Neill | 360/294.4 |
| 7,113,371 B1 | 9/2006 | Hanna et al. | |
| 7,280,316 B1 | 10/2007 | McCaslin et al. | |
| 7,408,743 B1 | 8/2008 | McCaslin et al. | |
| 7,542,239 B2 | 6/2009 | Resh et al. | |
| 7,606,000 B1 | 10/2009 | Brandts et al. | |
| 7,889,459 B2 | 2/2011 | Lee et al. | |
| 8,125,735 B2* | 2/2012 | Yao et al. | 360/234.6 |
| 8,159,789 B2 | 4/2012 | Fujimoto et al. | |
| 2003/0074783 A1* | 4/2003 | Boismier et al. | 29/603.03 |
| 2007/0223146 A1* | 9/2007 | Yao et al. | 360/294.4 |
| 2011/0188356 A1* | 8/2011 | Hirata et al. | 369/13.33 |

OTHER PUBLICATIONS

Imai, Satomitsu, "Verification of the Mechanism of the Head-Positioning Error Caused by Disk Flutter and Slider Supporting Structure for Reducing Head-Positioning Error" JSME International Journal, Series C, vol. 46, No. 3, 2003, pp. 1010-1016.

* cited by examiner

*Primary Examiner* — Allen T Cao
(74) *Attorney, Agent, or Firm* — HolzerIPLaw, PC

(57) ABSTRACT

A data storage system includes an actuator assembly including a load beam having a base plate end and a slider end. A bias feature is formed in the load beam near the base plate end of the load beam. The bias feature is configured to induce lateral motion on the load beam when the slider end is displaced along a z-axis. An anti-bias feature is positioned between the bias feature and the slider end of the load beam. The anti-bias feature is configured to induce lateral motion on the load beam during resonance of the load beam to oppose the lateral motion induced by the bias feature.

20 Claims, 9 Drawing Sheets

GIMBAL ASSEMBLY RESONANCE MODE ANTI-BIASING

BACKGROUND

Generally, a head gimbal assembly in a hard disc drive extends from a rotatable actuator arm and includes a load beam supporting a slider that flies parallel to a rotating storage disc surface. The slider typically contains one or more writers for writing data to the storage disc and one or more read sensors for retrieving data from the storage disc. The actuator arm and head gimbal assembly rotate about an actuator motor to align with individual radially-positioned target data tracks for reading and writing operations.

Among other control structures and circuitry, the actuator arm and head gimbal assembly operate to align the one or more read sensors and/or one or more write poles with a target data track. During rotation at high speeds, however, the storage disc can bend (e.g., up and down relative to the horizontal rotating plane) in a manner that is referred to as "disc flutter." Disc flutter can cause the slider to lose radial alignment with a target data track—the load beam supporting the slider bends to allow the slider to remain in close proximity to storage disc surface as storage disc flutters, but the slider also moves radially in and out relative to the center of the storage disc as the storage disc flutters. Such radial movement of the slider relative to the target data track can result in slider misalignment with the target data track, which is referred to as track mis-registration (TMR).

SUMMARY

Implementations described and claimed herein provide a data storage system including an actuator assembly including a load beam having a base plate end and a slider end. A bias feature is formed in the load beam near the base plate end of the load beam. The bias feature is configured to induce lateral direction motion on the load beam when bent along a z-axis. An anti-bias feature is positioned between the bias feature and the slider end of the load beam. The anti-bias feature is configured to induce lateral direction motion on the load beam during resonance of the load beam to oppose the motion in the lateral direction motion induced by the bias feature.

Other implementations are also described and recited herein.

BRIEF DESCRIPTIONS OF THE DRAWINGS

DETAILED DESCRIPTION

Implementations of the technology described herein may be employed in the context of a data storage system, including without limitation a gimbal assembly for a write head in a servo track writer and a read-write head in a magnetic storage drive, although other applications may also be contemplated for anti-biasing a load beam or other member using such technology.

Figure 1:
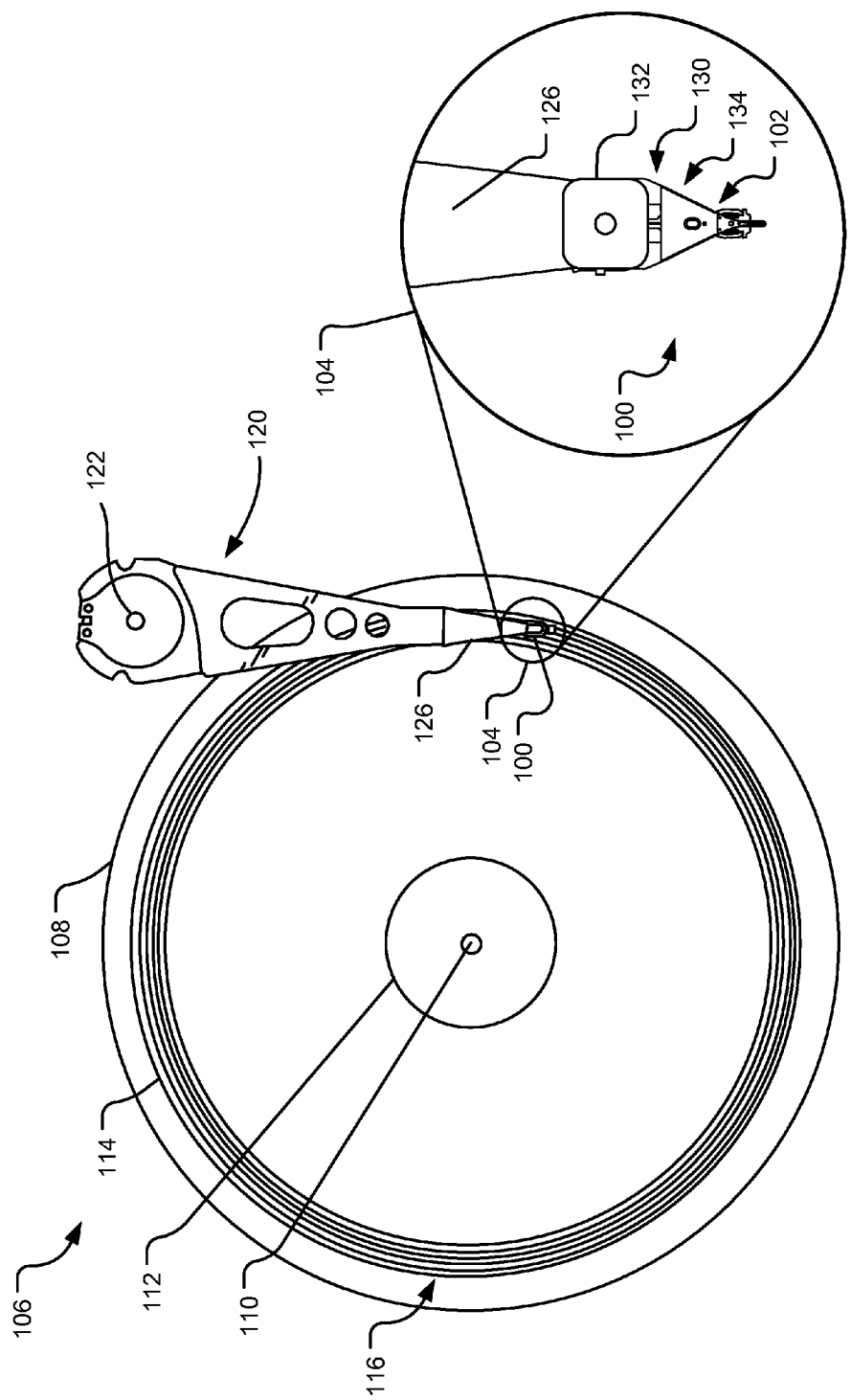
FIG. 1 illustrates an example gimbal assembly having a resonance mode anti-bias feature.

FIG. 1 illustrates an example gimbal assembly 100 having a resonance mode anti-bias feature 102, shown in more detail in an exploded view 104. Although other implementations are contemplated, in the illustrated implementation, a data storage device 106 includes a storage medium 108 (e.g., a magnetic data storage disc) on which data bits can be recorded using a magnetic write pole and from which data bits can be read using a magnetoresistive element. The storage medium 108 rotates about a spindle center or a disc axis of rotation 110 during rotation (the disc axis of rotation is parallel to a z-axis of the storage medium 108, which is orthogonal to the plane of the storage medium 108), and includes an inner diameter 112 and an outer diameter 114 between which are a number of concentric data tracks (examples shown as tracks 116). It should be understood that the described technology may be used with a variety of storage formats, including continuous magnetic media, discrete track (DT) media, shingled media, bit patterned media, etc.

Information may be written to and read from data bit locations in the data tracks on the storage medium 108. The head gimbal assembly 100 is mounted on suspension 126 extending from the actuator assembly 120. The head gimbal assembly 100 includes a load beam 134 that supports the slider above the disc surface, causing the slider (e.g., a read-write transducer head) positioned near the distal end of the head gimbal assembly 110 to fly in close proximity above the surface of the storage medium 108 during disc rotation. The actuator assembly 120 rotates during a seek operation about the actuator axis of rotation 122. The seek operation positions the head gimbal assembly 100, and therefore the slider, over a target data track for read and write operations.

The exploded view 104 schematically illustrates a plan view of the head gimbal assembly 100, wherein the storage medium is positioned below the head gimbal assembly 100. While the storage medium 108 rotates about the disc axis of rotation 110 at high speeds, edges of the disc can flutter, such that the edges of the disc can vibrate in and out of the normal plane of the storage medium 108. As the disc flutters, the head gimbal assembly 100 allows the slider to maintain a substantially consistent fly height relative to the surface of the storage medium 108. Accordingly, as the disc flutters, the slider moves in and out long the z-axis to maintain its separation from the disc surface.

In addition, the target track also moves radially outward along the disc plane as the disc bends down and radially inward along the disc plane as the disc bends up. Therefore, without compensation, the slider movement along the z-axis would also tend to cause the slider to move radially inward relative to the target track as the disc bends down and radially outward relative to the target track as the disc bends up relative to the z-axis. As such, uncompensated disc flutter can contribute to TMR and, therefore, impair the performance of the data storage device 106.

To compensate for the radial movement of the target track during disc flutter, the load beam 134 of the illustrated head gimbal assembly 100 includes a bias feature 130, which compensates by inducing an opposing radial movement of the slider (e.g., lateral motion or motion along the x-axis). In the illustrated implementation, the bias feature 130 includes two rails formed in the load beam 134 near a base plate 132. The rails are asymmetric along the z-axis (more of one rail is higher than the other rail long the z-axis), which causes the radially compensating movement of the slider during disc flutter. Generally, the bias feature 130 causes the load beam 134 to torque in opposition to the disc-flutter-induced radial movement of the slider relative to the target track. For example, as the disc bends down along the z-axis, the bias feature 130 torques to move the slider radially outward to follow the target track and, as the disc bends up along the z-axis, the bias feature 130 torques to move the slider radially inward to follow the target track. Accordingly, the bias feature 130 substantially reduces or eliminates the off-track radial movement of the slider relative to the storage medium 108.

However, the head gimbal assembly 100 experiences vibrations that impair the accuracy of biased tracking between the slider and the target track. For example, actuator vibrations at the end of a seek, windage, and other factors can introduce vibrations along the load beam 134. Such vibrations can counteract or impair the intended effect of the bias introduced by the bias feature 130. In particular, the load beam 134 can experience resonance mode vibrations relating to both the bias feature 130 and the distal edge of the slider that can cause non-trivial TMR effects. As such, the resonance mode anti-bias feature 102 is configured to slightly counter to the bias feature 102 and compensate for the resonance mode vibrations.

It should be understood that the load beam described with regard to FIG. 1 relates to a data storage device. Nevertheless, the combination of bias and resonance mode anti-bias feature may be applied to load beams in other systems.

Figure 2:
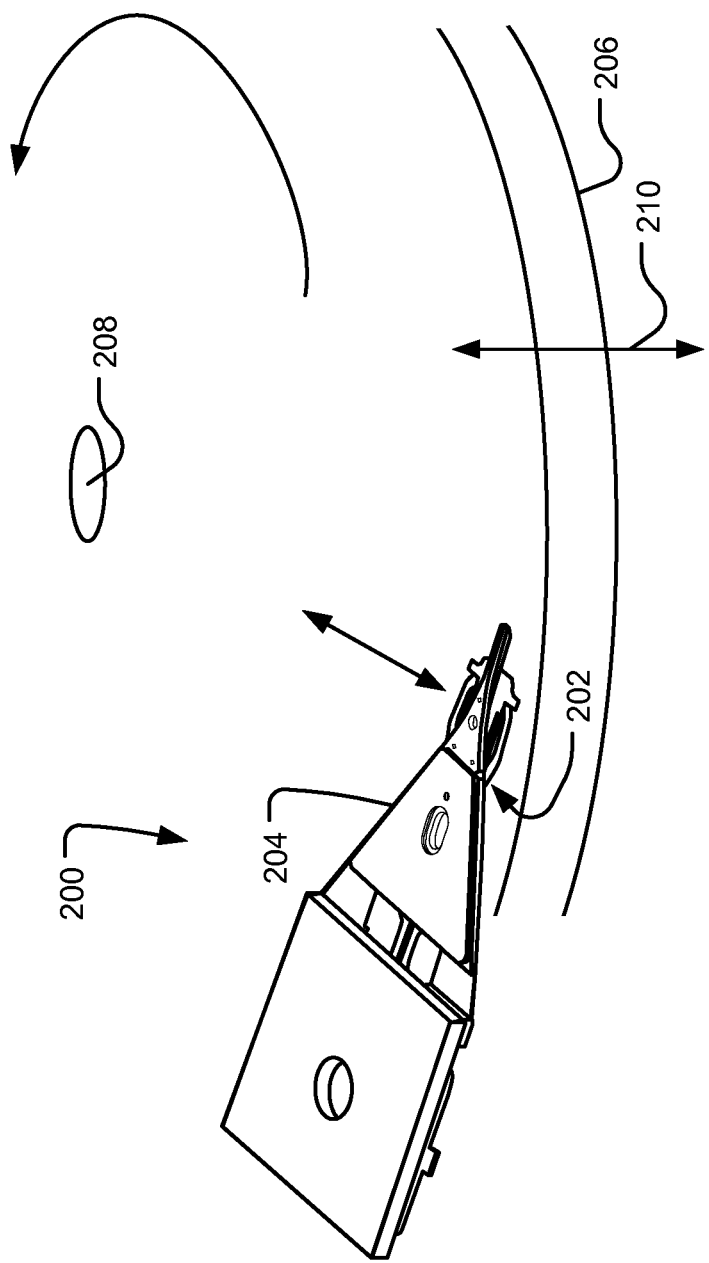
FIG. 2 illustrates a perspective view of an example gimbal assembly having a resonance mode anti-bias feature.

FIG. 2 illustrates a perspective view of an example gimbal assembly 200 having a resonance mode anti-bias feature 202 (a portion of which is visible just under the damper 204). The slider supported by the gimbal assembly 200 is capable of moving from inner diameter to outer diameter of a disc 206 as the disc rotates about a disc center 208, maintaining a substantially consistent fly height, even in the presence of disc flutter (illustrated with arrow 208).

Figure 3:
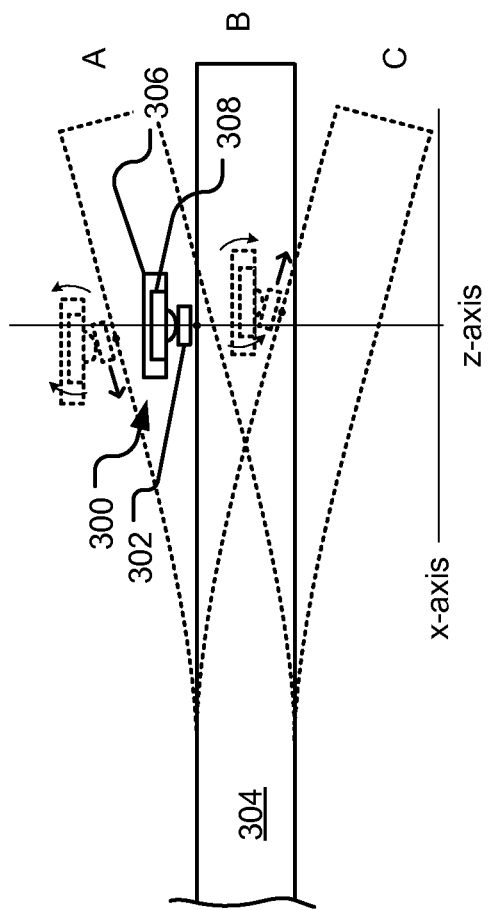
FIG. 3 illustrates an example load beam and slider in three disc flutter positions.

FIG. 3 illustrates an example load beam 300 and slider 302 in three disc flutter positions (A, B, and C). In position B, the disc 304 lies in its plane (in the absence of bending). The slider 302 is aligned with the target track (represented by the black dot on the surface of the disc 304) and supported by the load beam 300. The load beam 300 is shown as having two portions: (1) a wider portion 306 representing the wider section of the load beam 300 at which the bias feature is located), and (2) a thinner portion 308 representing a thinner section of the load beam at which the resonance-mode anti-bias feature is located.

In position A, the disc 304 bends up along the z-axis, the target track moves radially inward, and the bias feature in the wider portion 306 torques in the counterclockwise direction to move the slider radially inward (in an example of lateral motion) to follow the target track. In addition, in the presence of resonance mode vibrations along the load beam, the resonance mode anti-bias feature torques in the clockwise direction (counter to the torque of the bias feature) to compensate for the resonance mode vibrations experienced by the load beam 300. Accordingly, in a resonance mode of the load beam, the anti-bias feature induces lateral (e.g., radial) motion in the load beam that opposes the lateral motion of the load beam induced by the bias feature.

In position C, the disc 304 bends down along the z-axis, the target track moves radially outward, and the bias feature in the wider portion 306 torques in the clockwise direction to move the slider radially outward (in another example of lateral motion) to follow the target track. In addition, in the presence of resonance mode vibrations along the load beam, the resonance mode anti-bias feature torques in the counterclockwise direction (counter to the torque of the bias feature) to compensate for the resonance mode vibrations experienced by the load beam 300. Again, in a resonance mode of the load beam, the anti-bias feature induces lateral (e.g., radial) motion in the load beam that opposes the lateral motion of the load beam induced by the bias feature.

Figure 4:
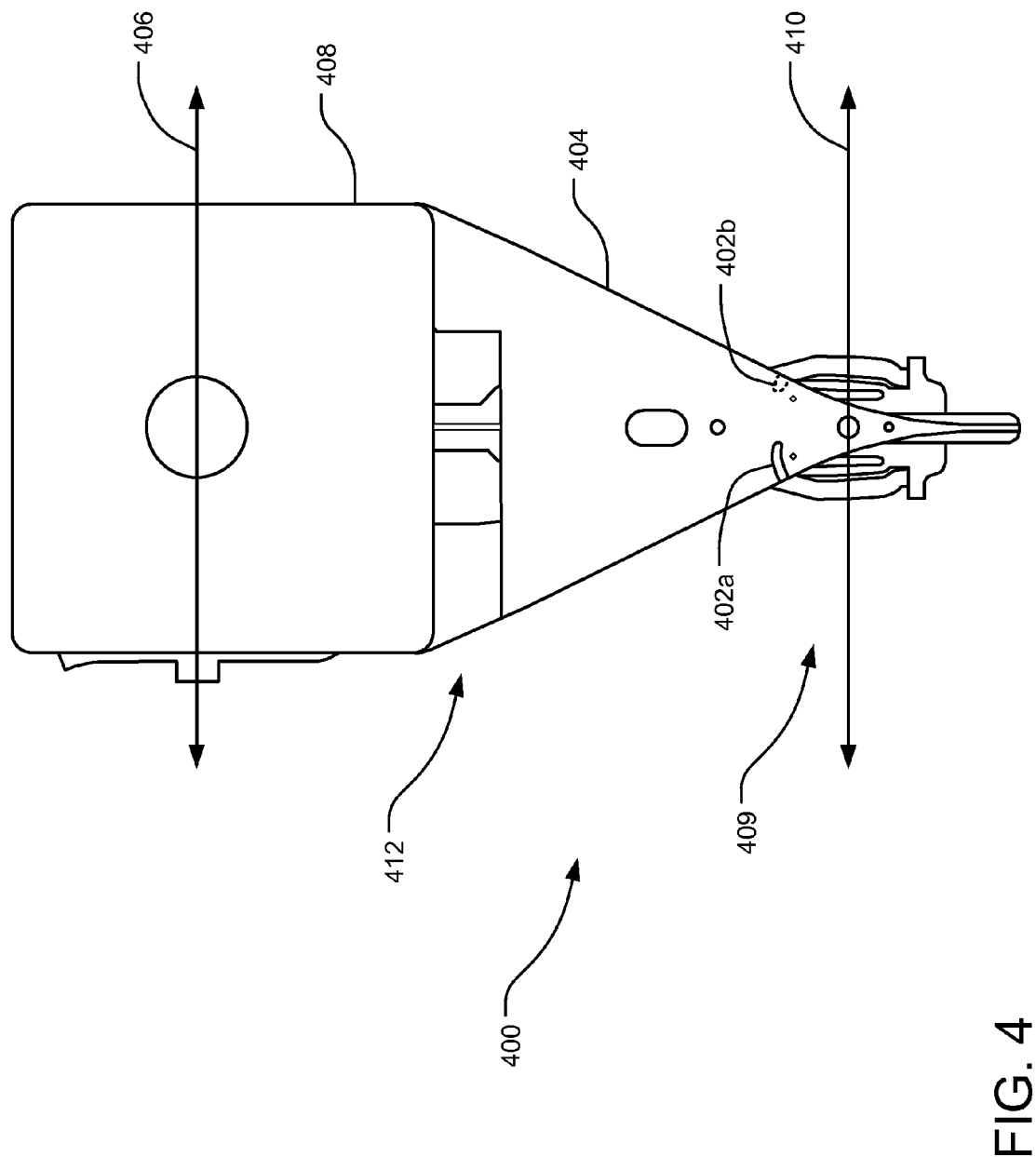
FIG. 4 illustrates a plan view of a gimbal assembly (with a damper removed) having an example resonance mode anti-bias feature on a load beam.

FIG. 4 illustrates a plan view of a gimbal assembly 400 (with a damper removed) having a resonance mode anti-bias feature 402 on a load beam 404. During a write operation, the gimbal assembly 400 can experience vibrations that are translated along the load beam of the gimbal assembly 400, between the base plate 408 and the slider region 409. To provide some context, an input axis 406 represents a lateral movement point at a base plate 408 relative to an output axis 410, which represents a lateral movement point at the slider (not shown). In some implementations, the region of the bias feature 412 is referred to as the first bend in the load arm or "1B" and can contribute to lateral movement of the slider during disc flutter, particularly at certain resonance frequencies. Further, in some implementation, a region near the anti-bias feature 402 is referred to as the second bend in the load arm or "2B" and can contribute to lateral movement of the slider during disc flutter, particularly at certain resonance frequencies. Each bend refers to the engineered bending of sections of the load beam in response to up and down movement of the slider in the presence of disc flutter.

Figure 7:
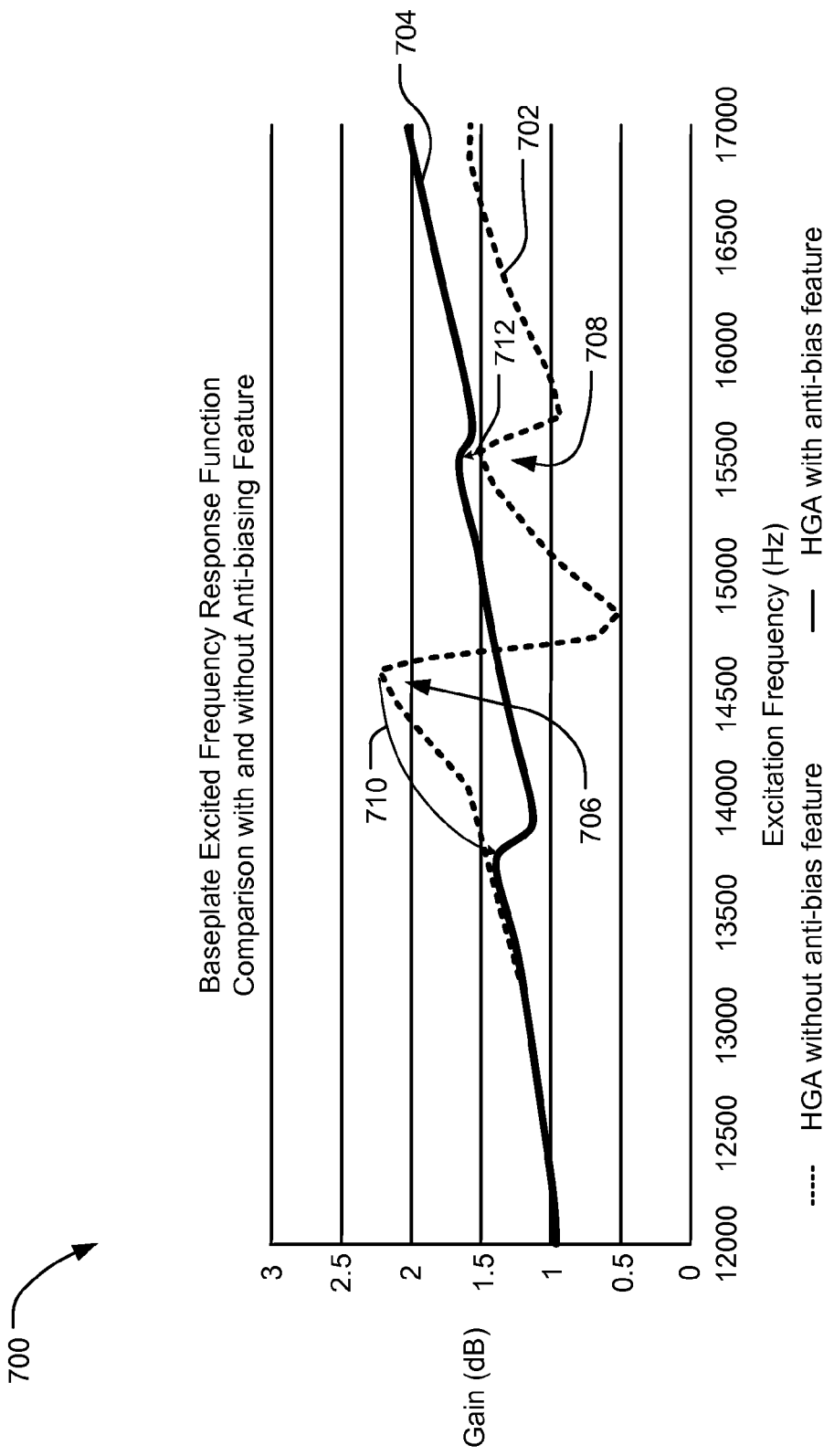
FIG. 7 illustrates a frequency response comparison between a gimbal assembly without a resonance mode anti-bias feature on a load beam and a gimbal assembly having a resonance-mode anti-bias feature on a load beam.

Referring briefly to FIG. 7, which shows a frequency response function between the input axis 406 and the output axis 410, the gain may be represented as:

$$\text{Gain} = \frac{\text{Output\_Movement}}{\text{Input\_Movement}}$$

wherein the slider vibrates laterally relative to the baseplate 408 along the load beam 404. FIG. 7 shows two resonance mode frequency response peaks at about 14,500 Hz and about 15,500 Hz in the dotted line plot representing the gimbal assembly without an anti-biasing feature. Such frequency response peaks can impair the effectiveness of a bias feature 412 when the load beam 404 experiences resonance frequencies.

Accordingly, the load beam 404 includes the resonance mode anti-bias feature 402 to compensate for the frequency mode peaks. In FIG. 4, the resonance mode anti-bias feature 402 includes two component features 402a and 402b. As illustrated, component feature 402a includes a notch etched out of the top of the load beam 404, and component feature 402b includes a notch etched out of the bottom of the load beam 404. This configuration of the resonance mode anti-bias feature 402 introduces torque that is opposing the torque introduced by a bias feature 412. It should be understood that other configurations of a resonance mode anti-bias feature may be employed (see, e.g., FIG. 9).

Placement of the resonance mode anti-bias feature depends on the spacing between the bias feature 412 and the axis 410. In one implementation, the resonance mode anti-bias feature 402 is placed such that there is a resonant node between the bias feature 412 and the anti-bias feature 402. Other configurations may be employed.

Figure 5:
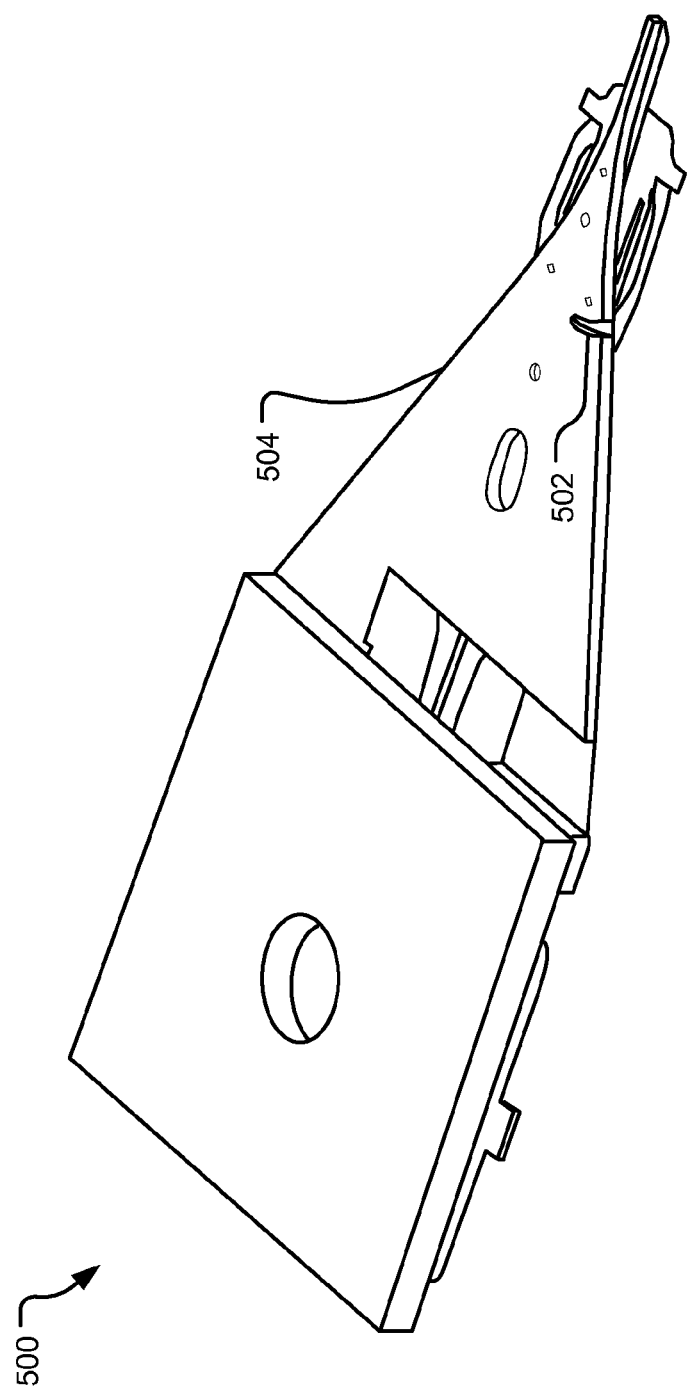
FIG. 5 illustrates a perspective view of a gimbal assembly (with a damper removed) having an example resonance mode anti-bias feature etched into the top side of a load beam.

FIG. 5 illustrates a perspective view of a gimbal assembly 500 (with a damper removed) having an example resonance mode anti-bias feature 502 etched into the top side of a load beam 504.

Figure 6:
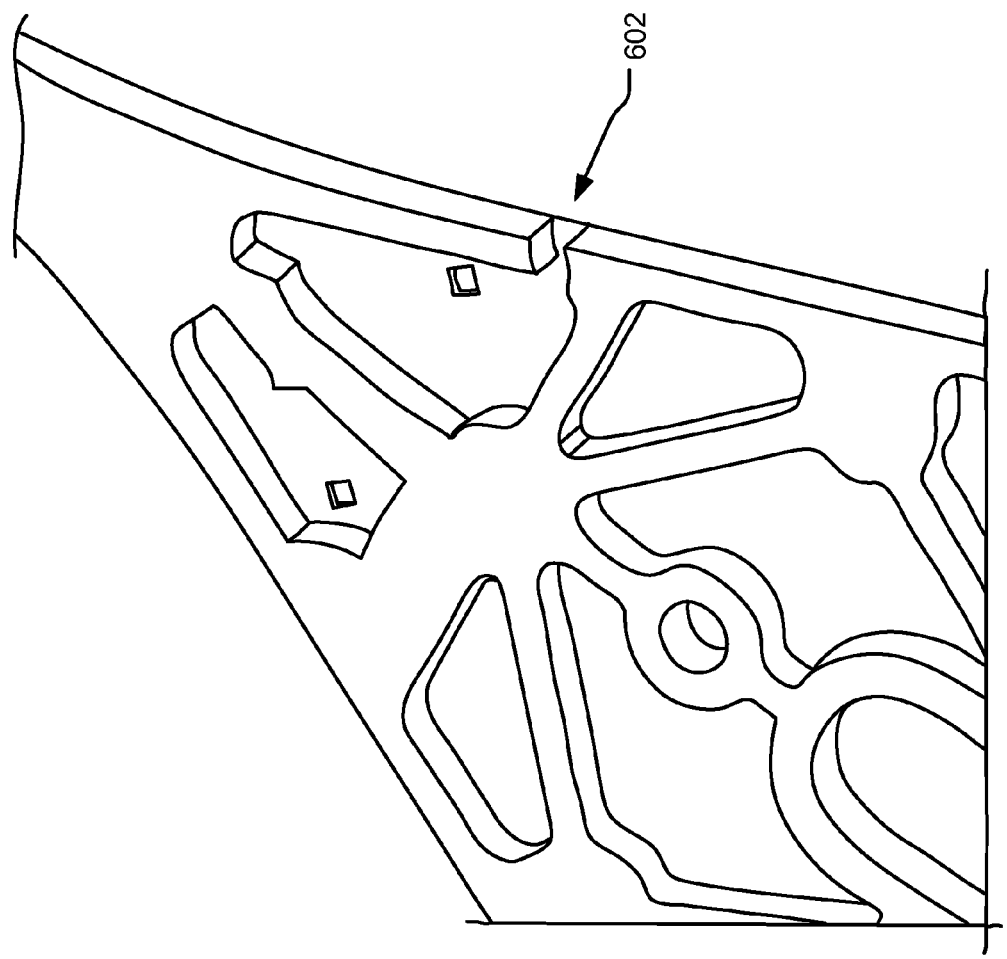
FIG. 6 illustrates a bottom perspective view of a load beam having a resonance mode anti-bias feature etched into the bottom side of the load beam.

FIG. 6 illustrates a bottom perspective view of a load beam 600 having an example resonance mode anti-bias feature 602 etched into the bottom side of the load beam 600.

FIG. 7 illustrates a frequency response comparison between a gimbal assembly without a resonance mode anti-bias feature on a load beam and a gimbal assembly having a resonance-mode anti-bias feature on a load beam. A graph 700 shows two functions: (1) a dashed line 702 showing the frequency response of a head gimbal assembly (HGA) without an anti-bias feature located in the load beam, and (2) a solid line 704 showing the frequency response of an HGA with an anti-bias feature located in the load beam. The dashed line 702 shows two significant peaks, a peak 706 at 14,500 Hz and another peak 708 at about 15,500 Hz. The peak 706 is associated with vibrations relating to the region of the load arm in which the bias feature is located (e.g., at 1B). The peak 708 is associated with vibrations relating to the region of the load arm near the slider (e.g., at 2B).

As shown in FIG. 7, the addition of the anti-bias feature decreases the frequency and the relative amplitude of the frequency response peak attributed to 1B (as shown by arrow 710) and decreases the frequency (slightly) and the relative amplitude of the frequency response peak attributed to 2B (as shown by arrow 712). In one implementation, the opposed biasing of the bias feature and the anti-bias feature cooperate to reduce these peaks.

Figure 8:
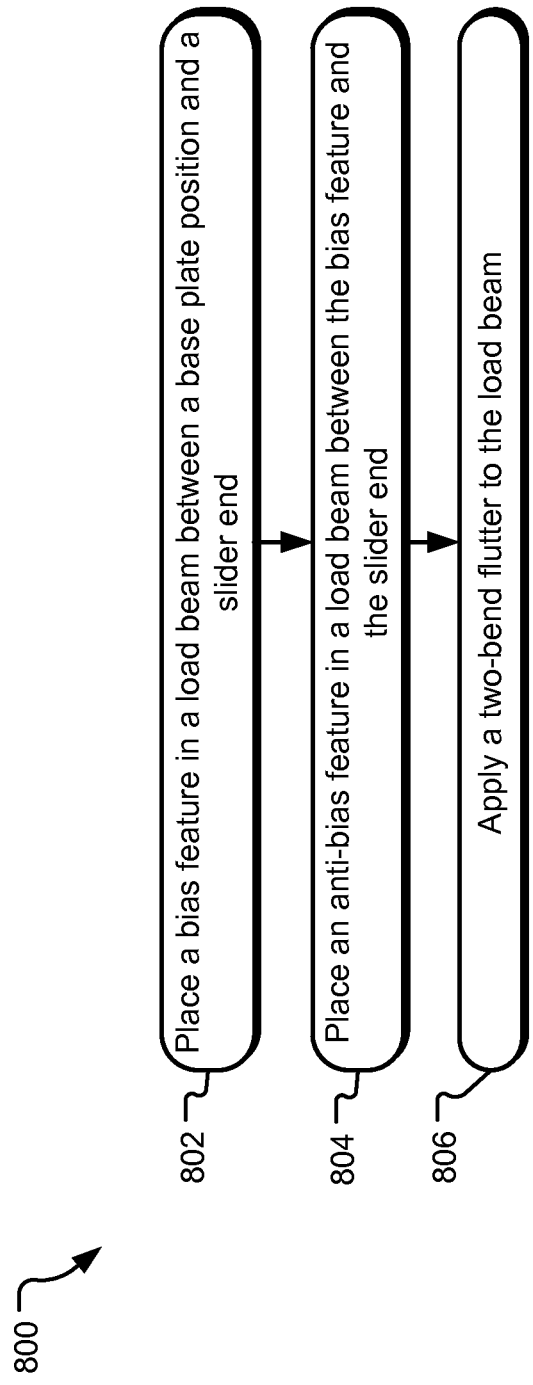
FIG. 8 illustrates example operations for providing a resonance mode anti-bias feature on a load beam of a gimbal assembly.

FIG. 8 illustrates example operations 800 for providing a resonance mode anti-bias feature on a load beam of a gimbal assembly. A placement operation 802 places a bias feature in a load beam between a base plate position and a slider end. Another placement operation 804 places a bias feature between the bias feature and the slider end. In one implementation, the resonance mode anti-bias feature is placed about ¾ of the distance from the bias feature and the slider end. However, placement may also be influenced by the relative widths of the load beam at points between the bias feature and the slider end. It should also be understood that these operations may be performed concurrently (e.g., during a single etch process) or in reverse order to that shown in FIG. 8.

A flutter operation 806 applies a slider end movement along a z-axis (see descriptions of FIGS. 1, 2, and 3), which induces a 2-bend deformation of the load beam. In one implementation, the combination of the bias feature and the anti-bias feature assist in improved slider-track alignment and the reduction of 1B and/or 2B frequency response peaks on the load beam.

Figure 9:
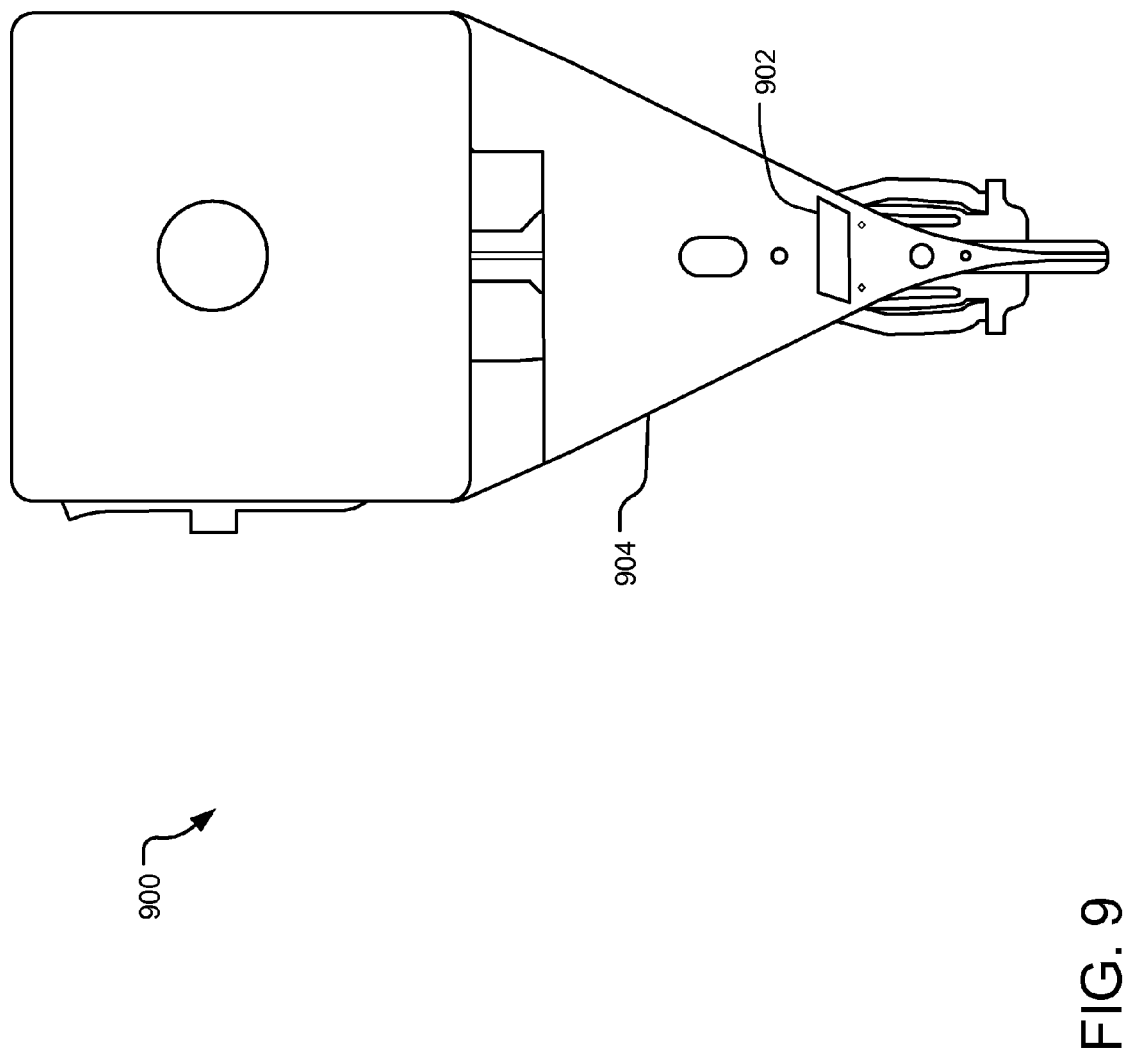
FIG. 9 illustrates a plan view of a gimbal assembly (with a damper removed) having an alternative example resonance mode anti-bias feature on a load beam.

FIG. 9 illustrates a plan view of a gimbal assembly 900 (with a damper removed) having an alternative example resonance mode anti-bias feature 902 on a load beam 904. In the illustrated configuration, the anti-bias feature 902 may be etched partially into or entirely through the load beam 908. Such a two-rail implementation, the angle of the rails induces the engineered bias.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A load beam having a proximate end and a distal end, the load beam comprising:
   a bias feature near the proximate end of the load beam, the bias feature inducing lateral motion on the load beam on the load beam when the distal end is displaced along a z-axis; and
   an anti-bias feature positioned between the bias feature and the distal end of the load beam, the anti-bias feature inducing lateral motion in the load beam during resonance of the load beam, the anti-bias-feature-induced lateral motion opposing the lateral motion induced by the bias feature.

2. The load beam of claim 1 wherein the bias feature is configured to move the distal end in a first direction along a x-axis when the load beam is bent in a first direction along the z-axis and in an opposing direction along the x-axis when the load beam is bent in an opposing direction along the z-axis.

3. The load beam of claim 2 wherein the anti-bias feature is configured to move the distal end in the opposing direction along the x-axis when the load beam is bent in the first direction along the z-axis and in the first direction along the x-axis when the load beam is bent in an opposing direction along the z-axis.

4. The load beam of claim 1 wherein the anti-bias feature is positioned with a resonant node between the bias feature and the anti-bias feature.

5. The load beam of claim 1 wherein the anti-bias feature includes a two-rail bias feature in the load beam near the slider end.

6. The load beam of claim 1 wherein the anti-bias feature is etched into the load beam.

7. The load beam of claim 1 wherein the load beam is configured to support a slider.

8. The load beam of claim 1 wherein the load beam is configured to support a slider at a fly height in proximity to a storage medium.

9. The load beam of claim 1 wherein the load beam is configured to attach to a base place of an actuator assembly.

10. The load beam of claim 1 wherein the load beam is configured to receive a damper affixed to a surface of the load beam.

11. A data storage system having an actuator assembly, the data storage system comprising:
    a load beam having a base plate end and a slider end;
    a bias feature formed in the load beam near the base plate end of the load beam, the bias feature inducing lateral motion on the load beam when the slider end is displaced along a z-axis; and
    an anti-bias feature positioned between the bias feature and the slider end of the load beam, the anti-bias feature inducing lateral motion in the load beam during resonance of the load beam, the anti-bias-feature-induced lateral motion opposing the lateral motion induced by the bias feature.

12. The data storage system of claim 11 wherein the bias feature is configured to move the slider end in a first direction along a x-axis when the load beam is bent in a first direction along the z-axis and in an opposing direction along the x-axis when the load beam is bent in an opposing direction along the z-axis.

13. The data storage system of claim 12 wherein the anti-bias feature is configured to move the slider end in the opposing direction along the x-axis when the load beam is bent in the first direction along the z-axis and in the first direction along the x-axis when the load beam is bent in an opposing direction along the z-axis.

14. The data storage system of claim 11 wherein the anti-bias feature is positioned with a resonant node between the bias feature and the anti-bias feature.

15. The data storage system of claim 11 wherein the anti-bias feature includes a two-rail bias feature in the load beam near the slider end.

16. A method comprising:
   positioning a bias feature in the load beam near a base plate end of the load beam, the bias feature inducing a lateral motion on the load beam when bent along a z-axis; and
   positioning an anti-bias feature between the bias feature and a slider end of the load beam, the anti-bias feature inducing lateral motion on the load beam during resonance of the load beam, the anti-bias-feature-induced lateral motion opposing the lateral motion induced by the bias feature.

17. The method of claim 16 comprising:
   inducing a z-axis movement in the slider end of the load beam relative to the base plate end of the load beam.

18. The method of claim 16 wherein positioning an anti-bias feature comprises:
   etching the anti-bias feature partially into the load beam.

19. The method of claim 16 wherein positioning an anti-bias feature comprises:
   etching the anti-bias feature entirely through the load beam.

20. The method of claim 16 wherein positioning an anti-bias feature comprises:
   positioning a resonant node between the bias feature and the anti-bias feature.

\* \* \* \* \*